United States Patent [19]

Baker et al.

[11] Patent Number: 5,443,157

[45] Date of Patent: Aug. 22, 1995

[54] AUTOMOBILE SHREDDER RESIDUE (ASR) SEPARATION AND RECYCLING SYSTEM

[75] Inventors: Bennie A. Baker, Brookside, N.J.; Kenneth L. Woodruff, Morrisville, Pa.; Joseph F. Naporano, Essex Fells, N.J.

[73] Assignee: Nimco Shredding Co., Newark, N.J.

[21] Appl. No.: 221,399

[22] Filed: Mar. 31, 1994

[51] Int. Cl.⁶ .................................................. B03B 7/00
[52] U.S. Cl. .................................... 209/12.1; 209/30; 209/38; 209/39; 241/24; 241/DIG. 38
[58] Field of Search ............. 209/10, 12.1, 30–39, 209/212, 290, 930; 241/24, 25, DIG. 38

[56] References Cited

U.S. PATENT DOCUMENTS

| | | | |
|---|---|---|---|
| 2,471,043 | 5/1949 | Schenck . | |
| 3,720,380 | 3/1973 | Marsh | 241/20 |
| 3,736,111 | 5/1973 | Gardner et al. . | |
| 3,945,575 | 3/1976 | Marsh | 241/DIG. 38 X |
| 3,970,546 | 7/1976 | Webb et al. | 209/12.1 X |
| 4,003,830 | 1/1977 | Schloemann | 209/212 X |
| 4,033,458 | 7/1977 | Chazen et al. | 209/11 |
| 4,034,861 | 7/1977 | Fontein et al. | 209/10 |
| 4,079,837 | 3/1978 | Grube et al. | 209/12.1 |
| 4,139,454 | 2/1979 | Larson | 209/12.1 |
| 4,165,278 | 8/1979 | Jaffey | 209/45 |
| 4,553,977 | 11/1985 | Fry | 209/930 X |
| 4,778,116 | 10/1988 | Mayberry | 241/DIG. 38 X |
| 4,844,351 | 7/1989 | Holloway | 209/930 X |
| 4,867,866 | 9/1989 | Mayberry | 209/30 |
| 4,929,342 | 5/1990 | Johnston | 209/12.1 |
| 5,009,370 | 4/1991 | Mackenzie | 209/12.1 X |
| 5,042,725 | 8/1991 | Grimmer | 241/DIG. 38 X |
| 5,080,291 | 1/1992 | Bloom | 241/24 X |
| 5,101,977 | 4/1992 | Roman | 209/12.1 X |

Primary Examiner—William E. Terrell
Assistant Examiner—Tuan N. Nguyen
Attorney, Agent, or Firm—Andrus, Sceales, Starke & Sawall

[57] ABSTRACT

An ASR separation and recycling system which permits the separation of ASR into many constituent components for recycling or reuse. Among the products recovered are steel, stainless steel, copper, aluminum, other non-ferrous metals, fine magnetic fraction (iron oxide product), clean grit, polyurethane foam, various plastics, fibers and rubber. The ASR separation and recycling system comprises four major components. The first is initial size and separation of ASR into three separate fractions. The second component comprises a grit processing subsystem. The third component is a rubber and plastics recovery subsystem and the fourth component is a polyurethane foam separation and cleaning subsystem.

15 Claims, 3 Drawing Sheets

AUTOMOBILE SHREDDER RESIDUE (ASR) SEPARATION AND RECYCLING SYSTEM

BACKGROUND OF THE INVENTION

The present invention relates to solid waste material sorting and recycling systems, and more particularly to an automobile shredder residue (ASR) sorting and recycling system.

Disposal of solid waste material creates an enormous problem. Disposal of scrap or junk vehicles are of particular concern since millions of passenger cars, trucks and busses continuously become old or non-usable. In order to recycle many of the components in such vehicles, shredders have been designed which mechanically tear the vehicles apart and separate them into two products, i.e. metallic scrap and automobile shredder residue (ASR). The metallic scrap is shipped to metal reprocessing centers, and the ASR material is shipped to a dump or land fill. However, due to the fact that automobiles are being designed to reduce the amount of metal components and increase the number of non-metal components, it has become desirable to develop systems for sorting and recycling as many of the reusable components as possible from the ASR material. As a result, several ASR sorting and recycling systems have been developed. There remains a need, however, for an improved system wherein the waste material can be processed into usable products.

SUMMARY OF THE INVENTION

The present ASR separation and recycling system permits the separation of ASR into many constituent components for recycling or reuse. Among the products recovered are steel, stainless steel, copper, aluminum, other non-ferrous metals, fine magnetic fraction (iron oxide product), clean grit, polyurethane foam, various plastics, fibers and rubber. The present ASR separation and recycling system comprises essentially four major components. The first is initial sizing and separation of ASR into three separate fractions. The second component comprises a grit processing subsystem. The third component is a rubber and plastics recovery subsystem and the fourth component is a polyurethane foam separation and cleaning subsystem.

In the present method, ASR is introduced into a two-stage trommel and separated into an undersized fraction, a middling fraction and an oversized fraction.

The undersized fraction is conveyed to a magnetic separator for recovery of ferrous materials and the non-magnetic materials are conveyed to the grit processing subsystem. The fine non-magnetic material or grit is screened to separate insulated and non-insulated wire. Wire is removed as the oversized fraction, and is marketed for copper recovery. The non-wire fraction is cleaned by air density separation to recover a clean grit product suitable for use as an aggregate material in concrete, portland cement or asphalt pavement manufacture.

The middling fraction from the trommel is conveyed to an air density separation system and separated into a light fraction and a heavy fraction. The light fraction contains light plastics, fibers and polyurethane foam materials which can be further processed for recovery of various types of plastics. The heavy fraction is subjected to magnetic separation for recovery of steel. The non-magnetic portion from the heavy fraction is further processed to recover non-magnetic metals such as aluminum, copper, brass and the like, and the remaining non-metallic material consisting largely of rubber and plastic is conveyed to the rubber and plastics recovery subsystem where the material is size reduced and then subjected to selected dissolution, density separation or froth flotation.

The oversized fraction from the trommel is conveyed to an air density separation system and separated into a heavy fraction and a light fraction. The heavy fraction is combined with the heavy fraction separated from the middling fraction for processing in the rubber and plastics recovery subsystem. The light fraction consisting largely of polyurethane foam is conveyed to the polyurethane foam separation and cleaning subsystem. This subsystem consists of a sharply inclined belt conveyor for separation of polyurethane foam which is then washed, de-watered, dried and baled for reuse.

BRIEF DESCRIPTION OF THE DRAWINGS

The drawings illustrate the best mode presently contemplated for carrying out the invention. In the drawings.

DETAILED DESCRIPTION OF THE PREFERRED EMBODIMENT

Figure 1:
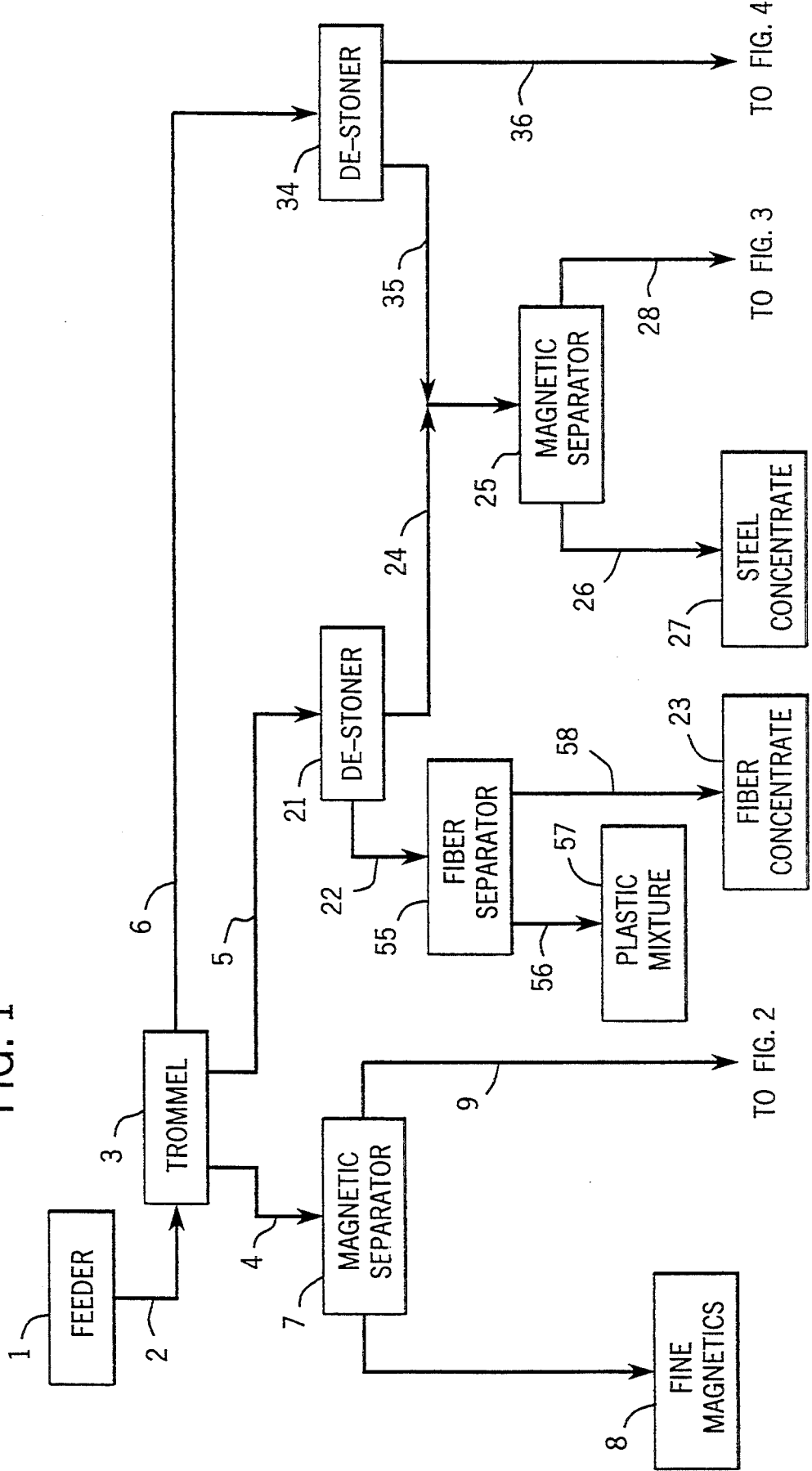
FIG. 1 is a schematic illustration of the ASR separation and recycling system embodying the method of the present invention.

Referring now to the drawings, FIG. 1 illustrates a method of separating and recycling ASR material. The ASR material includes such materials as steel, stainless steel, copper, aluminum, non-ferrous metals, glass, polyurethane foam, various plastics, fibers and rubber as well as other waste material that may be recycled or reused. Common examples of plastics utilized in automobile construction are polyethylene, polypropylene, polyvinylchloride, polyvinylacetate, polyurethane, nylon as well as others.

Flattened scrap automobiles are typically fed to an automobile shredder (not shown) which reduces the automobile to a mixture of the above referred to materials having various sizes and shapes. The shredder typically comprises a hammermill or similar device. From the shredder, the mixture is processed by air density separation and magnetic separation. The principally non-metallic fraction by-product is ASR. The admixture of ASR material is fed to the present system via a variable speed hopper feeder 1. From feeder 1 the ASR material is fed via line 2 to a screening apparatus, preferably a two stage trommel 3. Line 2 represents a constant speed weigh belt which receives the ASR material from the feeder 1 and monitors tonnage flow to the system, and further represents a belt conveyor which feeds trommel 3 from the weigh belt. Trommel 3 may also be referred to as a rotary screen, and is a well known device which comprises a large metal cylinder having perforations therein through which particulate solid material to be screened may drop as the trommel 3 is rotated. As is well known, trommel 3 is sized and rotated at a suitable speed for the volume of material to be screened or processed. Preferably, the first stage of trommel 3 is equipped with screen plating containing 5/16" diameter holes while the second stage is equipped with screen plating having 2⅜" diameter holes, although other hole diameters may be employed as desired. Therefore, as the ASR material travels down the rotating trommel 3 from its inlet, it is separated into an undersized fraction, a middling fraction and an oversized fraction. Takeaway conveyors represented by lines 4, 5 and 6 are provided for conveying the undersized, middling and oversized fractions, respectively, from trommel 3 to the remaining subsystems, as will hereinafter be described.

The undersized fraction from trommel 3 is first conveyed to a magnetic separator 7 of any conventional design for recovery of a ferrous metal product 8. This material may be shipped directly to a metal reclaiming facility. (The ferrous product 8 typically contains recyclable ferrous metals having a size of ¼" or less.) The nonmagnetic material from separator 7 is conveyed via line 9 to the grit processing subsystem.

Figure 2:
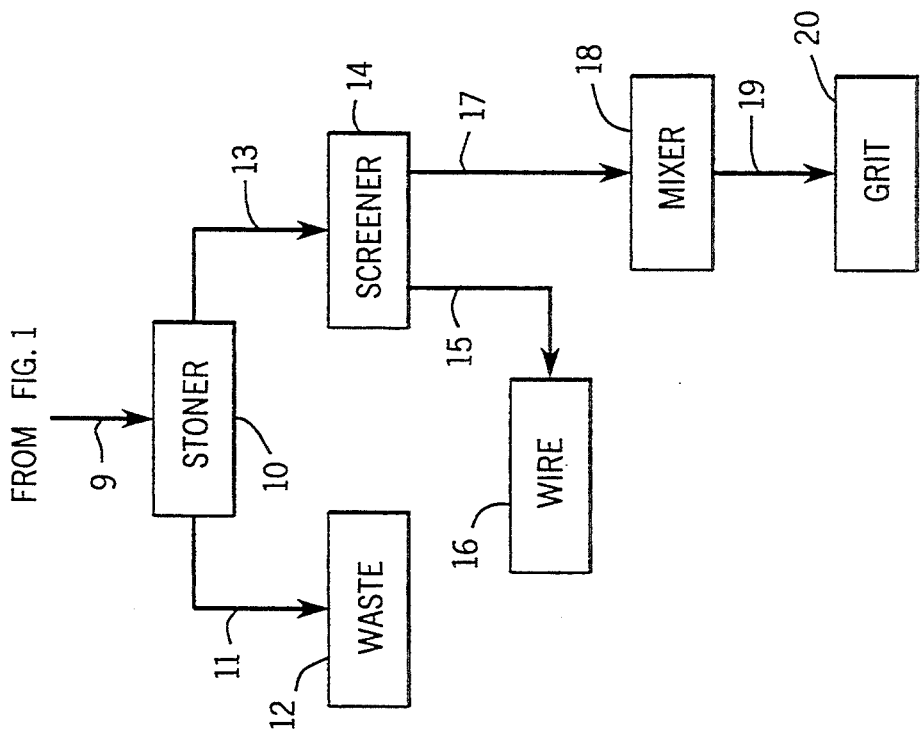
FIG. 2 is a schematic illustration of the grit processing subsystem.

Referring now to FIG. 2, the non-magnetic material called "grit" from separator 7 comprises small particulate materials such as dirt, stones, glass particles, and the like. This grit is first conveyed to an air density separation system 10 such as a horizontal air classifier or Triple/S Dynamics stoner where the grit is separated into a light fraction and a heavy fraction. The light fraction is conveyed via line 11 to a hopper 12 which contains waste of less than ¼" which is to be disposed of by burning, landfilling or the like. The heavy fraction from de-stoner 10 is conveyed via line 13 to a screening operation consisting of a SWECO screener 14 equipped with a punched plate deck containing ¼" diameter holes. The nature of the motion of screener 14 and the horizontal placement of the screen deck permits the separation of insulated and non-insulated wire from the heavy grit fraction. This wire is removed from screener 14 as an oversized fraction and conveyed via line 15 to a hopper 16. The wire concentrate within hopper 16 can then be further processed for copper and aluminum recovery.

The non-wire fraction from screener 14 is fed via line 17 into a mixer such as a pug mill or spiral classifier and then conveyed via line 19 to a hopper 20 for recovery of a clean grit product suitable for use as an aggregate material in concrete, portland cement or asphalt pavement manufacture. Mixer 18 provides for chemical addition of phosphoric acid or a trisodium phosphate solution prior to the recovery of clean grit for the purpose of stabilizing heavy metals such as lead and cadmium.

The middling fraction from trommel 3 has a particle size of about 5/16" to about 2⅜". This middling fraction is conveyed via line 5 to an air density separator 21 such as a horizontal air classifier or General Kinematics de-stoner. The middling fraction is separated in separator 21 into a light fraction and a heavy fraction. The light fraction is conveyed via line 22 to a fiber separator 55 which separates the light fraction into a non-fiber fraction which is transferred via line 56 to hopper 57 and a fiber concentrate which is transferred via line 58 to hopper 23. The non-fiber fraction in hopper 57 typically contains light plastics and polyurethane foam materials which may be further processed for recovery of various types of plastics, if desired. Otherwise, this light fraction concentrate is disposed of by burning (with or without energy recovery), landfilling or the like. Fiber concentrate 23 is suitable for recovery of nylon, polypropylene and other fibers.

Figure 3:
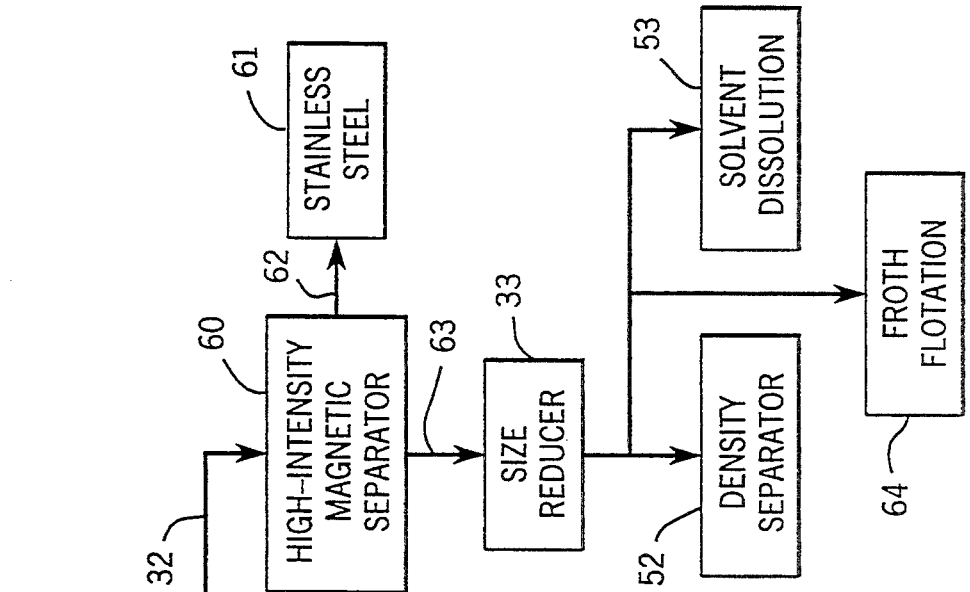
FIG. 3 is a schematic illustration of the rubber and plastics recovery subsystem.

The heavy fraction from separator 21 is conveyed via line 24 to a magnetic separator 25 for recovery of steel. The steel is conveyed via line 26 to a hopper 27 for further processing into recyclable material. The non-magnetic portion from separator 25 is further processed to recover non-magnetic metals and other non-metallic materials. Thus, the non-magnetic portion from magnetic separator 25 is conveyed via line 28 to a separator 29 such as an eddy current separator. Aluminum, copper, brass, zinc and lead are recovered via line 30 to hopper 31 in this manner. The remaining non-metallic materials from separator 29 are then fed via line 32 to a high intensity magnetic separator 60 for recovery of stainless steel 61 via line 62. The other non-metallic material from separator 60 is then fed via line 63 to the rubber and plastic recovery subsystem of FIG. 3.

Following recovery of ferrous and non-ferrous metals from the heavy fraction from separator 21, the mixture which consists largely of rubber and plastic materials is first fed via line 63 to a size reducer 33 such as a hammermill, shredder or granulator to produce particulate matter of less than ¼" in size. This mixture may then be separated using one of several approaches, i.e. a density separator 52, a solvent dissolution system 53 or froth flotation 54.

The first approach involves washing and rinsing the material to remove dirt, as well as oil and grease contamination. The material is then separated by density using a combination of hydrocyclone, heavy liquid separation and/or gravity table separation. In this way, the mixture is separated into concentrates of various types of plastics. For example, the fraction having a specific gravity of less than 1.0 is suitable for recovery of polyethylene and polypropylene. The 1.0 to 1.2 specific gravity fraction is suitable for recovery of styrenic plastics such as ABS, polystyrene, etc. Materials having greater than about 1.2 specific gravity is suitable for polyvinylchloride recovery. An improved froth flotation technique developed for recovery of various plastics from the fractions concentrated by density is disclosed in U.S. patent application Ser. No. 08/060,698 filed May 10, 1993 and entitled "Separation Of Normally Hydrophobic Plastic Materials By Froth Flotation." The specification of Ser. No. 08/060,698 is specifically incorporated herein by reference.

The second approach which may be utilized for plastic recovery from the granulated mixture is selective dissolution. In this method, oil and grease contamination is removed via a solvent. Various plastic substances are then dissolved selectively using one or more solvents at varying temperatures and pressures. Solvents include but are not limited to xylene, toluene, tetrahydrofuran and acetone.

Referring back to FIG. 1, the oversized fraction from trommel 3 comprises materials of a size greater than about 2⅜". This oversized fraction is conveyed via line 6 to an air density separator 34 such as a horizontal air classifier or General Kinematics de-stoner to produce a heavy fraction and a light fraction. The heavy fraction from air density separator 34 is conveyed via line 35 to magnetic separator 25 and joins the heavy fraction from the trommel middling stream air density separator 21. This heavy fraction is thereafter processed in the manner previously described herein to recover ferrous metals, non-ferrous metals and various rubber and plastics.

Figure 4:
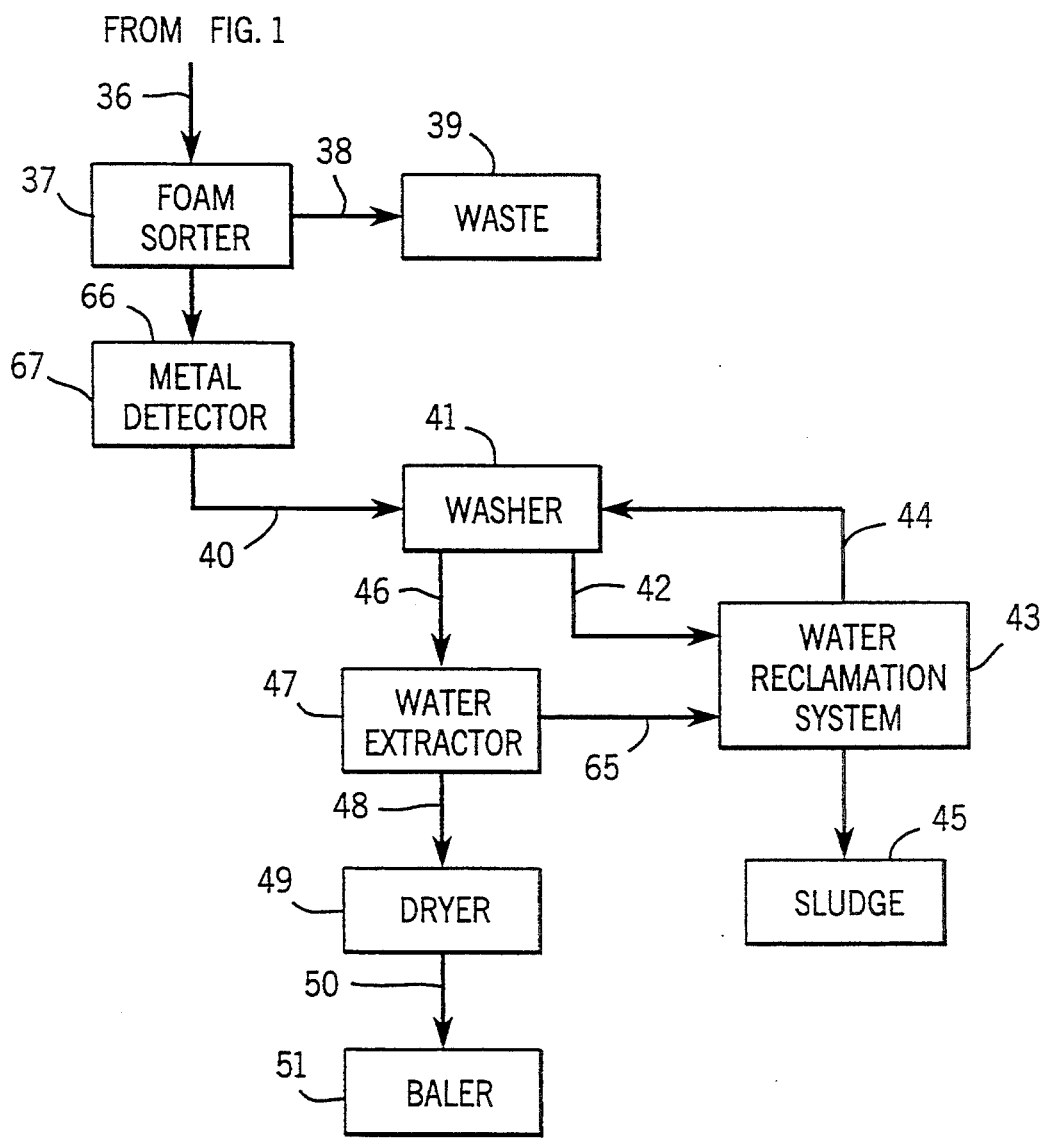
FIG. 4 is a schematic illustration of the polyurethane foam separation and cleaning subsystem.

The light fraction from separator 34, which consists largely of polyurethane foam, is conveyed via line 36 to the polyurethane foam separation and cleaning subsystem shown in FIG. 4. The polyurethane foam separation and cleaning subsystem comprises a steeply inclined belt conveyor 37. The feed stream from line 36 is dropped onto the conveyor 37 near its tail end. This causes the low density foam to bounce and roll off the tail end of conveyor 37 while the more dense materials are conveyed up to the top of conveyor 37. Hand sorting may be utilized along with the above belt separation method to produce a foam fraction free of metals and tramp materials. The more dense material is conveyed via line 38 to a waste bin 39 for appropriate disposal as for example to a landfill or incinerator.

Once separated, the low density polyurethane foam is conveyed via line 66 through a metal detector 67 to assure a metal free product and then via line 40 to a tunnel washer 41 where the foam is cleaned by water and detergent washing to remove dirt and grit as well as oil and grease. The water from washer 41 is directed via line 42 to a reclamation system 43 for reuse via line 44 in washer 41 while at the same time generating a sludge fraction 45 for disposal.

The tunnel washer 41 may utilize a combination of hot water, Ph adjustment and detergents for the cleaning operation or may utilize Ph adjustment only in conjunction with ozone injection. The washed and rinsed polyurethane foam is then fed via line 46 to a water extractor 47 such as a press or other similar device. The water from extractor 47 is recycled to reclamation system 43 via line 65. The dewatered foam is then conveyed via line 48 to a dryer 49 and then via line 50 to a baler 51 for reuse and shipment to market.

An ASR separation and recycling system has been illustrated and described which permits the separation of ASR material into many constituent components for recycling or reuse. Among the products recovered are steel, stainless steel, copper, aluminum, other non-ferrous metals, fine magnetic fractions such as iron oxide products, clean grit, polyurethane foam, various plastics, fiber and rubber.

Various modes of carrying out the invention are contemplated as being within the scope of the following claims particularly pointing out and distinctly claiming the subject matter regarded as the invention.

I claim:

1. A method of sorting and separating automobile shredder residue, comprising the steps of:
   separating automobile shredder residue into an undersize fraction, a middling fraction and an oversize fraction;
   separating the undersize fraction into a ferrous portion and a non-ferrous portion;
   separating the middling fraction into a light fraction and a heavy fraction;
   separating the oversize fraction into a light stream and a heavy stream;
   combining the heavy fraction from the middling fraction with the heavy stream from the oversize fraction; and
   magnetically separating the heavy fraction from the middling fraction and the heavy stream from the oversize fraction to recover steel and a non-magnetic portion.

2. The method of claim 1 wherein the step of separating the undersize fraction comprises magnetically separating the undersize fraction.

3. The method of claim 1 further comprising screening the non-ferrous portion derived from separating the undersize fraction to recover a wire fraction and a grit fraction.

4. The method of claim 1 wherein the non-magnetic portion derived from the heavy fraction and the heavy stream is further separated into non-magnetic metals and non-metallic materials.

5. The method of claim 4 wherein the step of further separation is accomplished by eddy current separation.

6. The method of claim 1 wherein the light stream from the oversize fraction is further density separated to provide a low density material and a high density material.

7. The method of claim 6 further comprising the step of cleaning the low density material.

8. The method of claim 7 wherein the step of cleaning comprises washing the low density material.

9. The method of claim 8 further including the step of extracting water from the low density material subsequent to washing.

10. The method of claim 9 further including the step of drying the low density material subsequent to water extraction, 11. The method of claim 4 wherein the non-metallic materials are size reduced to provide a granulated mixture.

12. The method of claim 11 further including the step of separating the granulated non-metallic materials by density, 13. The method of claim 11 further including the step of separating the granulated non-metallic materials by selective solvent dissolution.

14. The method of claim 1 further including the step of separating the light fraction derived from the middling fraction into a fiber concentrate and a plastic mixture.

15. The method of claim 3 comprising the further step of mixing a chemical stabilizer with the grit fraction to stabilize heavy metals in the grit fraction.

* * * * *

UNITED STATES PATENT AND TRADEMARK OFFICE
CERTIFICATE OF CORRECTION

PATENT NO. : 5,443,157
DATED : August 22, 1995
INVENTOR(S) : Baker et al

It is certified that error appears in the above-indentified patent and that said Letters Patent is hereby corrected as shown below:

IN THE REFERENCES CITED:

On the title page, item [56]:  
U.S. Patent Documents

Add the following U.S. patent references:
---5,120,767, Allard et al, dated 6/1992; and 5,344,025, Tyler et al, 9/1994---.

On the title page,  
Foreign Patent Documents

Add the following foreign patent references:
---439,701, Europe, 8/1971; and 472,242, Europe, 2/1992---.

Signed and Sealed this

Fifth Day of November, 1996

*Attest:*

BRUCE LEHMAN

*Attesting Officer*  *Commissioner of Patents and Trademarks*